(12) United States Patent
Bryant, Jr. et al.

(10) Patent No.: US 12,553,352 B2
(45) Date of Patent: Feb. 17, 2026

(54) METHOD AND SYSTEM OF FORMING A COMPOSITE AIRFOIL HAVING A SET OF PLIES

(71) Applicant: GENERAL ELECTRIC COMPANY, Schenectady, NY (US)

(72) Inventors: Gary Willard Bryant, Jr., Loveland, OH (US); Wendy Wen-Ling Lin, Montgomery, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 28 days.

(21) Appl. No.: 18/610,855

(22) Filed: Mar. 20, 2024

(65) Prior Publication Data

US 2025/0297551 A1    Sep. 25, 2025

(51) Int. Cl.
*F01D 5/28* (2006.01)
*B29C 70/38* (2006.01)
*B29L 31/08* (2006.01)

(52) U.S. Cl.
CPC .......... *F01D 5/282* (2013.01); *B29C 70/382* (2013.01); *B29L 2031/08* (2013.01); *F05D 2230/31* (2013.01); *F05D 2300/6034* (2013.01)

(58) Field of Classification Search
CPC ... F01D 5/282; F05D 2230/31; B29L 2031/08
See application file for complete search history.

(56) References Cited

U.S. PATENT DOCUMENTS

| | | | |
|---|---|---|---|
| 5,340,280 A | | 8/1994 | Schilling |
| 5,375,978 A | * | 12/1994 | Evans ............... B64C 11/26 |
| | | | 416/241 A |
| 6,045,651 A | | 4/2000 | Kline et al. |
| 8,573,947 B2 | | 11/2013 | Klinetob et al. |
| 9,488,056 B2 | | 11/2016 | Nagle et al. |
| 9,828,864 B2 | | 11/2017 | Whitehurst et al. |
| 10,041,354 B2 | | 8/2018 | Kray et al. |
| 10,202,853 B2 | | 2/2019 | Kleinow |
| 10,774,660 B2 | * | 9/2020 | Luczak ............ F01D 5/147 |
| 10,914,176 B2 | | 2/2021 | Kamiya et al. |
| 11,014,857 B2 | | 5/2021 | Weaver et al. |
| 11,370,181 B2 | * | 6/2022 | Van Nieuwenhove .......... |
| | | | B29C 70/30 |
| 11,524,466 B2 | | 12/2022 | Meyer et al. |
| 2010/0028594 A1 | | 2/2010 | Kray et al. |
| 2019/0277141 A1 | | 9/2019 | Gill |
| 2019/0315075 A1 | | 10/2019 | Gill |
| 2022/0268159 A1 | | 8/2022 | Postec et al. |

FOREIGN PATENT DOCUMENTS

| | | |
|---|---|---|
| DE | 102022206242 A1 | 12/2023 |
| EP | 1910062 B1 | 1/2010 |

* cited by examiner

*Primary Examiner* — Michael L Sehn
(74) *Attorney, Agent, or Firm* — Venable LLP; Andrew W. Bradshaw; Michele V. Frank

(57) ABSTRACT

A method of forming an assembly. The assembly having a stack of plies and an airfoil portion. The airfoil portion has an outer wall extending between a root and a tip in a spanwise direction, and between a leading edge and a trailing edge. The assembly has a first set of plies and a second set of plies. The first set of plies form at least a portion of the airfoil portion.

20 Claims, 6 Drawing Sheets

METHOD AND SYSTEM OF FORMING A COMPOSITE AIRFOIL HAVING A SET OF PLIES

TECHNICAL FIELD

The disclosure generally relates to an airfoil, and more specifically to a composite airfoil having a set of plies.

BACKGROUND

Turbine engines, and particularly gas or combustion turbine engines, are rotary engines that extract energy from a flow of gases passing through a fan with a plurality of fan blades, then into the engine through a series of compressor stages, which include pairs of rotating blades and stationary vanes, through a combustor, and then through a series of turbine stages, which include pairs of rotating blades and stationary vanes. The blades are mounted to rotating disks, while the vanes are mounted to stator disks.

Some components of the turbine engine can include composite materials. Composite materials typically include a fiber-reinforced matrix and exhibit a high strength to weight ratio. Due to the high strength to weight ratio and moldability to adopt relatively complex shapes, composite materials are utilized in various applications, such as a turbine engine or an aircraft. Composite materials can be, for example, installed on or define a portion of the fuselage, wings, rudder, manifold, airfoil, or other components of the aircraft or turbine engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DESCRIPTION OF EMBODIMENTS OF THE INVENTION

Figure 1:
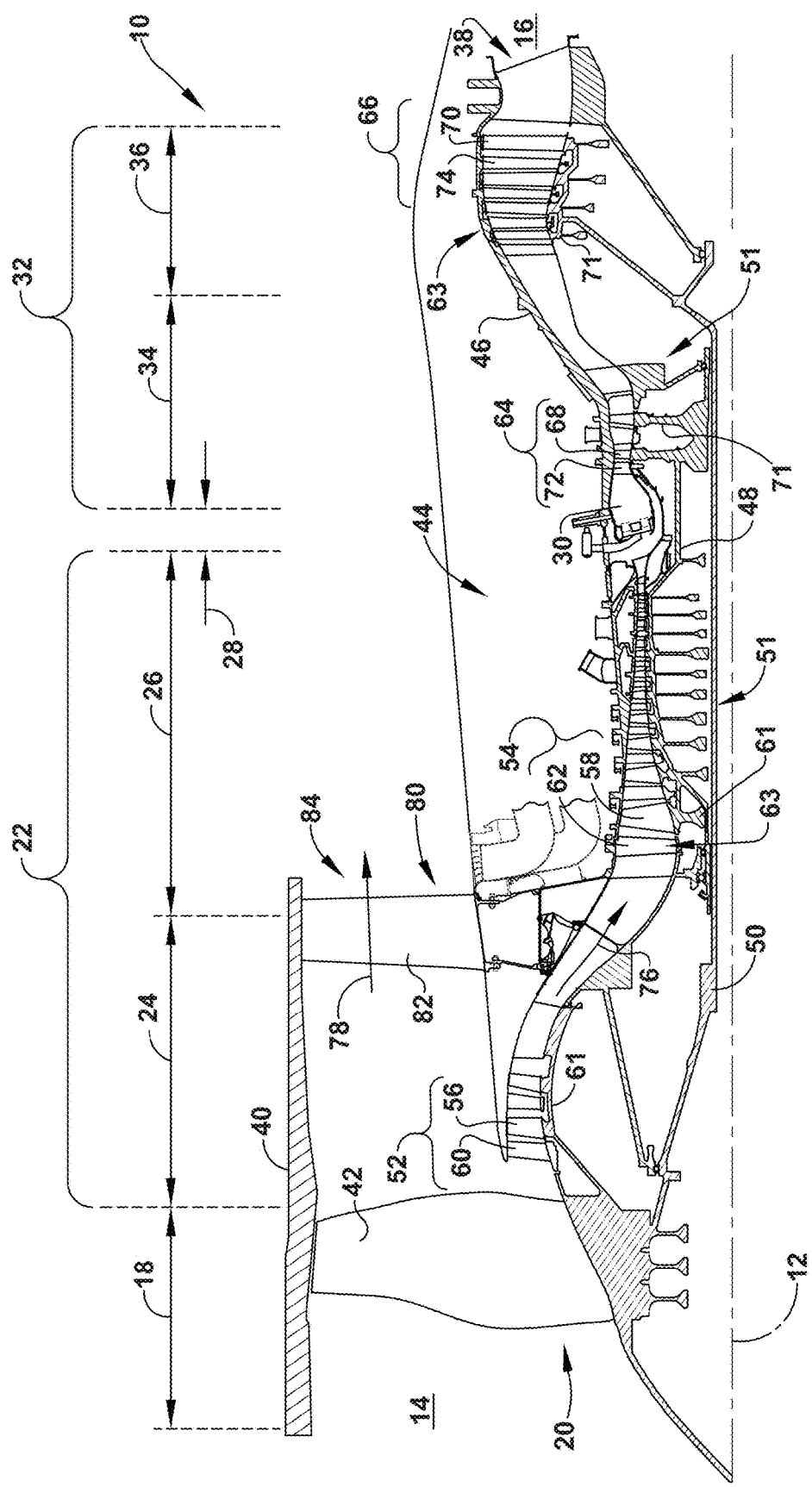
FIG. 1 is a schematic cross-sectional view of a turbine engine in accordance with an exemplary embodiment of the present disclosure.

Aspects of the disclosure herein are directed to an assembly including an airfoil portion. The assembly includes a composite material. The assembly includes at least a first set of plies and a second set of plies. The first set of plies are different in at least one of a construction or a material than the second set of plies. The assembly is constructed by stacking or otherwise arranging the first set of plies via using an automated processes (e.g., via robotics or machinery), while the second set of plies are arranged manually (e.g., by hand or through human intervention). Constructing the assembly through a hybrid method of using both an automated process and manual process allows for a decreased burden of manufacture without sacrificing the overall construction (e.g., strength) of the assembly itself when compared to the manufacture of the assembly through only the automated process or only the manual process.

For purposes of illustration, the present disclosure will be described with respect to the composite airfoil being provided within a turbine engine. It will be understood, however, that aspects of the disclosure described herein are not so limited and can have general applicability within other engines or within other portions of the turbine engine. For example, the disclosure can have applicability for a rotatable disk, seal cartridge, and blade in other engines or vehicles, and can be used to provide benefits in industrial, commercial, and residential applications.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "axial" and "longitudinal" both refer to a direction parallel to a centerline axis of an object, while the terms "radial" or "radially" refer to a direction that is perpendicular to the axial direction or away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

Further yet, as used herein, the term "fluid" or iterations thereof can refer to any suitable fluid within the gas turbine engine at least a portion of the gas turbine engine is exposed to such as, but not limited to, combustion gases, ambient air, pressurized airflow, working airflow, or any combination thereof. It is yet further contemplated that the gas turbine engine can be other suitable turbine engines such as, but not limited to, a steam turbine engine or a supercritical carbon dioxide turbine engine. As a non-limiting example, the term "fluid" can refer to steam in a steam turbine engine, or to carbon dioxide in a supercritical carbon dioxide turbine engine.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The term "composite," as used herein is, is indicative of a component having two or more materials. A composite can be a combination of at least two or more metallic, non-metallic, or a combination of metallic and non-metallic elements or materials. Examples of a composite material can be, but are not limited to, a polymer matrix composite (PMC), a ceramic matrix composite (CMC), a metal matrix composite (MMC), carbon fibers, a polymeric resin, a thermoplastic resin, bismaleimide (BMI) materials, polyimide materials, an epoxy resin, glass fibers, and silicon matrix materials.

As used herein, a "composite" component refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, wherein the adhesive can require curing at elevated temperatures or other hardening techniques.

As used herein, PMC refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked plies desired for the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific example of high performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers or matrix material to a mold or cavity. The dry fibers or matrix material can include prepreg, braided material, woven material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can require post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated.

The dry fibers or matrix material can be contoured to shape the composite component or direct the resin. Optionally, additional layers or reinforcing layers of a material differing from the dry fiber or matrix material can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain non-limiting examples, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, and subsequent chemical processing to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

The term "metallic" as used herein is indicative of a material that includes metal such as, but not limited to, titanium, iron, aluminum, stainless steel, and nickel alloys. A metallic material or alloy can be a combination of at least two or more elements or materials, where at least one is a metal.

FIG. 1 is a schematic cross-sectional diagram of a turbine engine 10 for an aircraft. The turbine engine 10 has a generally longitudinally extending axis or centerline 12 extending forward 14 to aft 16. The turbine engine 10 includes, in a downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the engine centerline 12. The HP compressor 26, the combustor 30, and the HP turbine 34 form an engine core 44 of the turbine engine 10, which generates combustion gases and provides power to rotate the fan 20 to produce thrust. The engine core 44 is surrounded by a core casing 46, which can be coupled with the fan casing 40.

An HP shaft 48 is disposed coaxially about the engine centerline 12 of the turbine engine 10 drivingly connects the HP turbine 34 to the HP compressor 26. An LP shaft 50, which is disposed coaxially about the engine centerline 12 of the turbine engine 10 within the larger diameter annular HP shaft 48, drivingly connects the LP turbine 36 to the LP compressor 24 and fan 20. The shafts 48, 50 are rotatable about the engine centerline 12 and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outward relative to the engine centerline 12, from a blade platform to a tip, while the corresponding static compressor vanes 60, 62 are positioned upstream of and adjacent to the rotating compressor blades 56, 58. It is noted that the number of blades, vanes, and compressor stages shown in FIG. 1 were selected for illustrative purposes only, and that other numbers are possible.

The compressor blades 56, 58 for a stage of the compressor 24, 26 can be mounted to (or integral to) a disk 61, which is mounted to the corresponding one of the HP and LP shafts 48, 50. The static compressor vanes 60, 62 for a stage of the compressor 24, 26 can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74, also referred to as a nozzle, to extract energy from the stream of fluid passing through the stage. In a single turbine stage 64, 66, multiple turbine blades 68, 70 can be provided in a ring and can extend radially outward relative to the engine centerline 12 while the corresponding static turbine vanes 72, 74 are positioned upstream of and adjacent to the rotating turbine blades 68, 70. It is noted that the number of blades, vanes, and turbine stages shown in FIG. 1 were selected for illustrative purposes only, and that other numbers are possible.

The turbine blades 68, 70 for a stage of the turbine can be mounted to a disk 71, which is mounted to the corresponding one of the HP and LP shafts 48, 50. The turbine vanes 72, 74 for a stage of the compressor can be mounted to the core casing 46 in a circumferential arrangement.

Complementary to the rotor portion, the stationary portions of the turbine engine 10, such as the static vanes 60, 62, 72, 74 among the compressor and turbine sections 22, 32 are also referred to individually or collectively as a stator 63. As such, the stator 63 can refer to the combination of non-rotating elements throughout the turbine engine 10.

It will be appreciated that the turbine engine 10 can be split into at last two separate portions: a rotor portion and a stator portion. The rotor portion can be defined as any portion of the turbine engine 10 that rotates about a respective rotational axis. The stator portion can be defined by a combination of non-rotating elements provided within the turbine engine 10. As a non-limiting example, the rotor portion can include one or more of the plurality of fan blades 42, the compressor blades 56, 58, or the turbine blades 68, 70. As a non-limiting example, the stator portion can include one or more of the plurality of fan vanes 82, the static compressor vanes 60, 62, or the static turbine vanes 72, 74.

In operation, the airflow exiting the fan section 18 is split such that a portion of the airflow is channeled into the LP compressor 24, which then supplies a pressurized airflow 76 to the HP compressor 26, which further pressurizes the air.

The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the turbine engine 10 via the exhaust section 38. The driving of the LP turbine 36 drives the LP spool 50 to rotate the fan 20 and the LP compressor 24.

A remaining portion of the airflow exiting the fan section 18, referred to as a bypass airflow 78, bypasses the LP compressor 24 and engine core 44 and exits the turbine engine 10 through a stationary vane row, and more particularly an outlet guide vane assembly 80, comprising a plurality of airfoil guide vanes 82, at a fan exhaust side 84. More specifically, a circumferential row of radially extending airfoil guide vanes 82 are utilized adjacent the fan section 18 to exert at least some directional control of the airflow 78.

The turbine engine 10, as illustrated, is a turbofan engine. It will be appreciated, however, that the turbine engine 10 can be any suitable engine such as, but not limited to, a turboprop engine, a turboshaft engine, a ducted turbofan engine, an unducted engine, or an open rotor turbine engine. As a non-limiting example, the turbine engine 10 can be an unducted turbine engine. The unducted turbine engine includes a set of external fan blades and external fan vanes that extend radially outward from a nacelle or exterior casing that houses the engine core. The external fan blades and the external fan fans are similar in function with respect to the fan blades 42 and airfoil guide vanes 82, respectively, of the turbine engine 10. It will be appreciated that at least a portion of the external fan blades or the external vane blades can define a radial extreme of the turbine engine 10 (e.g., a radially farthest portion of the turbine engine 10 from the engine centerline 12). In other words, no portion of the turbine engine 10 is provided radially outward from the external fan blades or external fan vanes in an unducted turbine engine.

Figure 2:
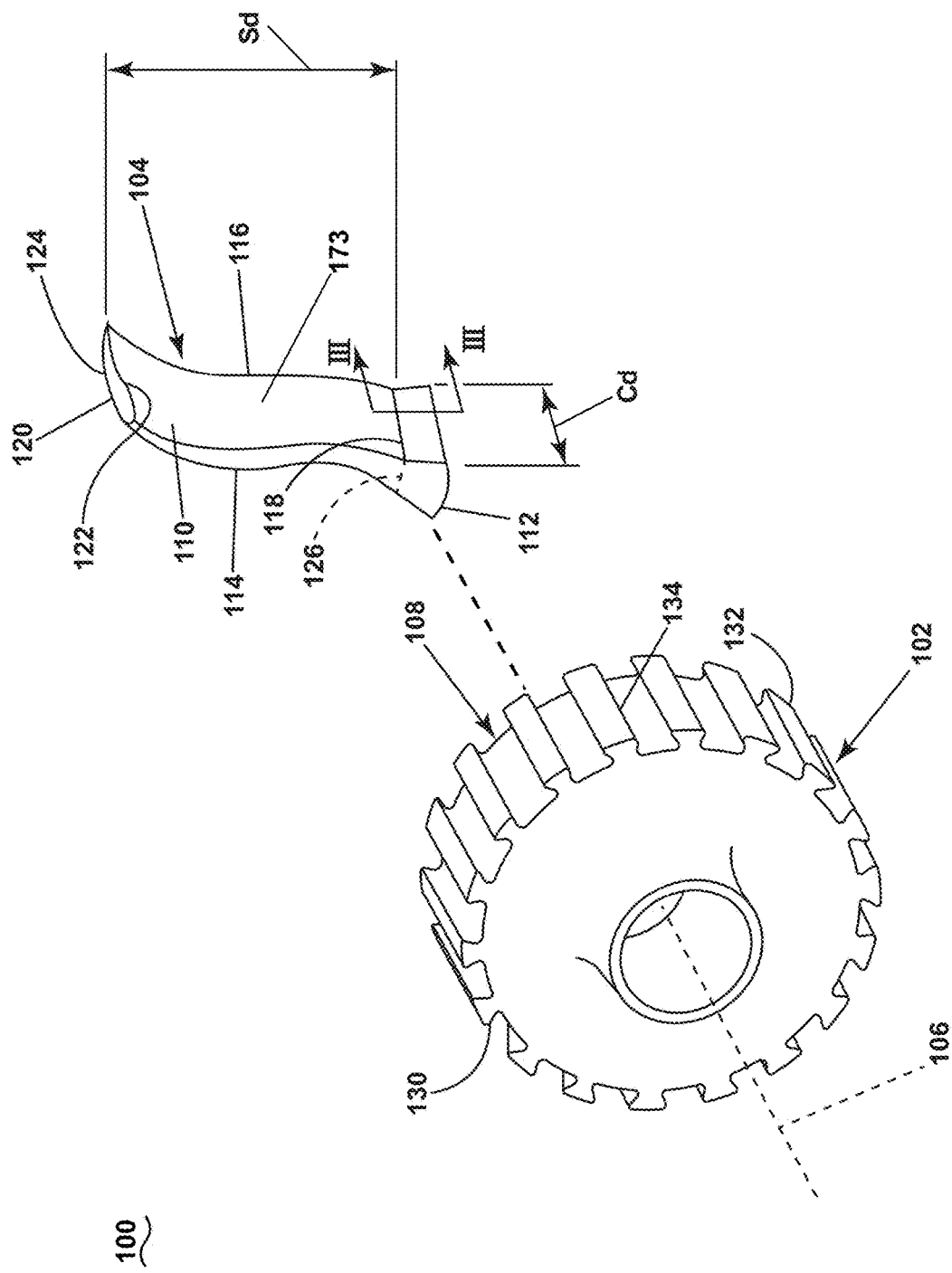
FIG. 2 is a schematic perspective view of an assembly suitable for use within the turbine engine of FIG. 1, the assembly comprising a rotatable disk and a composite airfoil having an airfoil portion and a dovetail portion.

FIG. 2 is a schematic perspective view of an assembly 100 including a rotatable disk 102 and a composite airfoil 104 suitable for use within the turbine engine 10 of FIG. 1. The rotatable disk 102 is suitable for use as the rotatable disk 61, 71 (FIG. 1) or any other disk such as, but not limited to, a disk within the fan section 18 (FIG. 1). The rotatable disk 102 is rotatable about a rotational axis 106. The rotational axis 106 can coincide with or be offset from the engine centerline of the turbine engine (e.g., the engine centerline 12 of FIG. 1).

The rotatable disk 102 includes a forward surface 130, an aft surface 132, and a peripheral surface 134 interconnecting the forward surface 130 and the aft surface 132. A plurality of slots 108 (one of which is referenced in FIG. 2) extend axially along the peripheral surface 134 between the forward surface 130 and the aft surface 132. Each slot of the plurality of slots 108 extends radially inward from the peripheral surface 134 towards the rotational axis 106.

The composite airfoil 104 includes an airfoil portion 110 and a dovetail portion 112 extending from the airfoil portion 110. For purposes of illustration, a transition 126 between the dovetail portion 112 and the airfoil portion 110 has been illustrated in phantom lines. The dovetail portion 112 can define a portion of the composite airfoil 104 that flares circumferentially outward from the airfoil portion 110. The dovetail portion 112 defines a portion of the composite airfoil 104 receivable within a respective slot of the plurality of slots 108.

The airfoil portion 110 includes an outer wall 173. The outer wall 173 extends between a leading edge 114 and a trailing edge 116 in a chord-wise direction (Cd). The composite airfoil 104 extends between a root 118 and a tip 120 in a span-wise direction (Sd). The dovetail portion 112 terminates radially at the root 118. The airfoil portion 110 includes a pressure side 122 and a suction side 124.

The composite airfoil 104 is coupled to the disk 102 by inserting the composite airfoil 104, specifically the dovetail portion 112, into a respective slot of the plurality of slots 108. When assembled, the airfoil portion 110 extends radially outward from the peripheral surface 134. The composite airfoil 104 is held in place by frictional contact with the slot 108 or can be coupled to the slot 108 via any suitable coupling method such as, but not limited to, welding, adhesion, bonding, fastening, or the like. While only a single composite airfoil 104 is illustrated, it will be appreciated that there can be any number of one or more composite airfoils 104 in the assembly 100. As a non-limiting example, a total number of composite airfoils 104 can correspond to a total number of slots in the plurality of slots 108.

While described as the composite airfoil 104 being mounted to a rotatable disk 102, it will be appreciated that the composite airfoil 104 can be any suitable static or rotating airfoil. In terms of a static airfoil, the composite airfoil 104 can be mounted to a static body, as opposed to the rotatable disk. As such, the composite airfoil 104 can be at least one of the static compressor vanes 60, 62 (FIG. 1), the set of compressor blades 56, 58 (FIG. 1), the static turbine vanes 72, 74 (FIG. 1), the set of turbine blades 68, 70 (FIG. 1), or the plurality of fan blades 42. In the instance where the composite airfoil 104 is mounted to a stationary component of the turbine engine 10 (FIG. 1), the body identified by the rotatable disk 102 can be any suitable stationary portion of the turbine engine 10 (FIG. 1) that the composite airfoil 104 is couplable to, such as, but not limited to, a band, a shroud, a casing, or the like.

Figure 3:
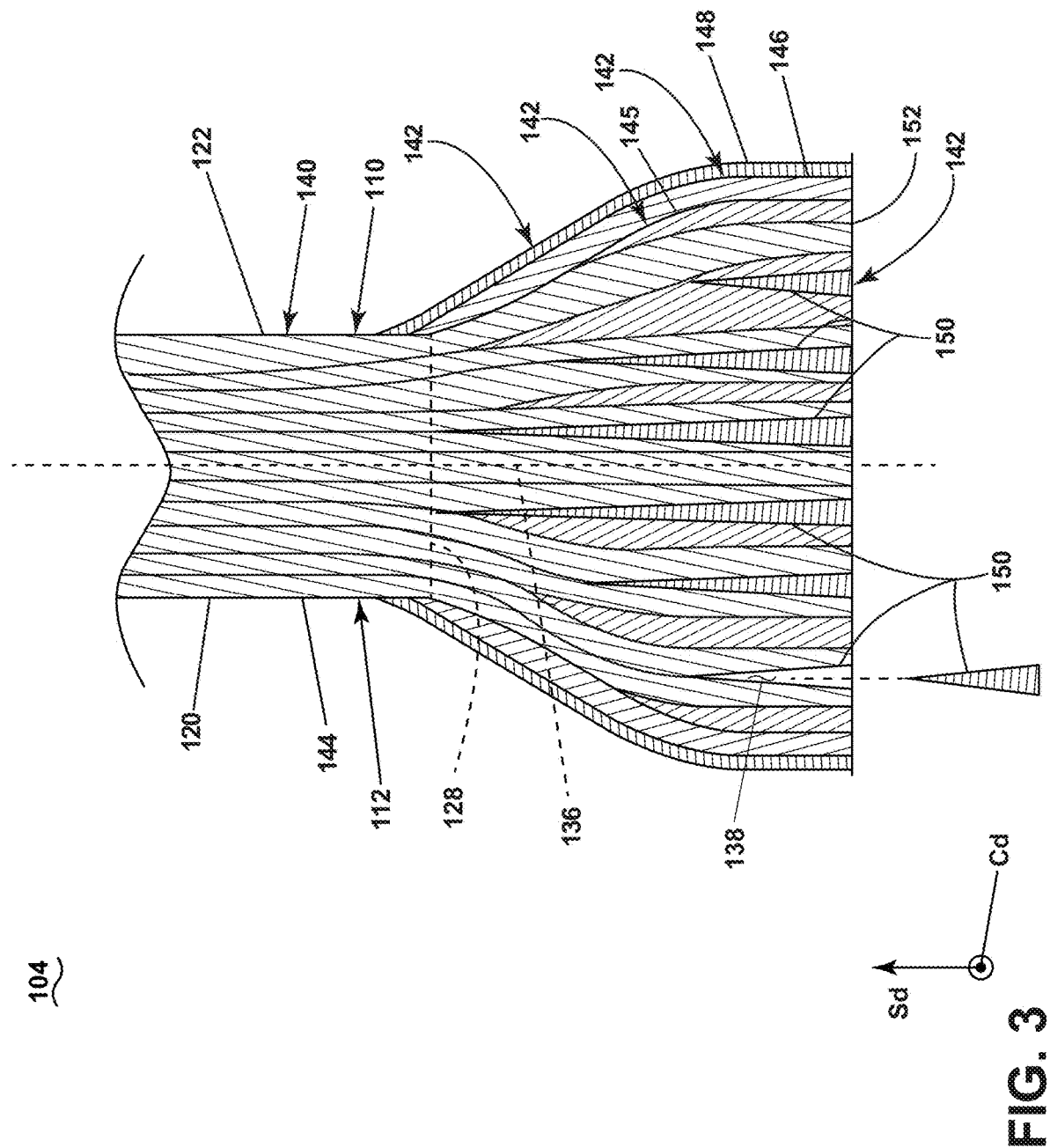
FIG. 3 is a schematic cross-sectional view of a portion of the composite airfoil as seen along sectional-line III-III of FIG. 2, the composite airfoil including a first set of plies and a second set of plies.

FIG. 3 is a schematic cross-sectional view of a portion of the composite airfoil 104 as seen along sectional-line III-III of FIG. 2. The composite airfoil 104 includes a centerline axis 136. The composite airfoil 104 terminates axially along the centerline axis 136 at a proximal end 152. The dovetail portion 112 can include a set of insert plies 150. The set of insert plies 150 can be provided within and subsequently coupled to a respective portion of the composite airfoil 104.

The composite airfoil 104 can include at least a first set of plies 140 and a second set of plies 142. Each of the first set of plies 140 and the second set of plies 142 can be made of a respective plurality of fibers bonded together. As used herein, the term bonding or iterations thereof refers to the coupling of fibers together to form a unitary body. The bonding can be done through, for example, adhesives or by curing the fibers together. By way of a non-limiting example, the first set of plies 140 and the second set of plies 142 can include at least a PMC portion, a polymeric portion, or both. The PMC can include, but is not limited to, a matrix of thermoset (epoxies, phenolics) or thermoplastic (polycarbonate, polyvinylchloride, nylon, acrylics) and embedded glass, carbon, steel, or a combination thereof. It will be appreciated that the airfoil portion 110 can include a composite material, a metallic material, any other suitable material, or a combination thereof.

The first set of plies 140 can be provided along any suitable portion of the composite airfoil 104. The first set of plies 140 can include any suitable ply. As a non-limiting example, the first set of plies 140 can include a first set of structural plies 144. As used herein, a structural ply is a sheet of bonded composite fibers that are used to form the body of the composite airfoil 104. As a non-limiting example, at least the outer wall 173 (FIG. 2) or an interior of the composite airfoil 104 can be made entirely of the set of structural plies 144.

The second set of plies 142 can be provided along any suitable portion of the composite airfoil 104. The second set of plies 142 can include any suitable ply. As a non-limiting example, the second set of plies 142 can include a second set of structural plies 145, a set of pad plies 146, a set of machining plies 148, the set of insert plies 150, or a combination thereof. The set of machining plies 148 can be provided radially over the set of pad plies 146, with respect to the centerline axis 136. As used herein, a machining ply can include any suitable sheet of bonded composite fibers that can be machined or otherwise shaped to form a desired shape of the machining ply. A machining ply can include any ply that is intentionally cured to a respective portion of the composite airfoil 104 with the intention of machining the ply after curing. Machining plies are used in parts with tighter tolerances (e.g., smaller parts or otherwise complex geometry) that can only be achieved through machining are included in the composite airfoil 104. As used herein, an insert ply can be any suitable ply or combination of plies (e.g., a packet of plies) that are bonded together and inserted between respective plie of the composite airfoil 104. The set of insert plies 150 are used to provide for the shape of the dovetail portion 112. As a non-limiting example, the set of insert plies 150 are provided radially between portions of the first set of structural plies 144, the second set of structural plies 145, or a combination thereof. The set of insert plies 150 are shaped and oriented such that the set of insert plies 150 push out the first set of structural plies 144 and the second set of structural plies 145 to produce a desired cross-section of the dovetail portion 112 (e.g., the illustrated flared cross-section of the dovetail portion 112). As used herein, a pad ply can include any suitable sheet of bonded composite fibers that overlay a respective portion of the composite airfoil 104 to reduce a radius of curvature that the structural ply is required to extend.

The first set of structural plies 144 and the second set of structural plies 145 can be the same (e.g., formed of the same material, having the same fiber orientation, or the like) or different (e.g., formed of differing materials, having differing fiber orientations, or the like) with respect to one another. The difference, however, is that the first set of structural plies 144 are larger than the second set of structural plies 145. As a non-limiting example, each first structural ply of the first set of structural plies 144 is longer than each second structural ply of the second set of structural plies 145. The first set of structural plies 144 and the second set of structural plies 145 can be alternately or non-alternately spaced. As a non-limiting example, two or more first structural plies of the set first structural plies can be directly coupled to one another. Alternatively, two or more second plies of the second set of structural plies 145 can be provided between the two or more first structural plies.

The set of pad plies 146 can be provided over and subsequently coupled to a respective portion of the first set of structural plies 144, the second set of structural plies 146, or a combination thereof. The set of machining plies 148 can be provided over and subsequently coupled to a respective portion of the set of pad plies 146. The coupling of the first set of structural plies 144, the second set of structural plies 145, the set of pad plies 146, the set of machining plies 148, and the set of insert plies 150 to respective portions of the composite airfoil 104 can be done through any suitable coupling method such as, but not limited to, adhesion, bonding or curing.

The first set of plies 140 differ from the second set of plies 142 in at least one way. As a non-limiting example, the first set of plies 140 and the second set of plies 142 include at least one differing material, material property (e.g., strength, ductility, resilience, etc.), overall size, construction, or combination thereof.

Figure 4:
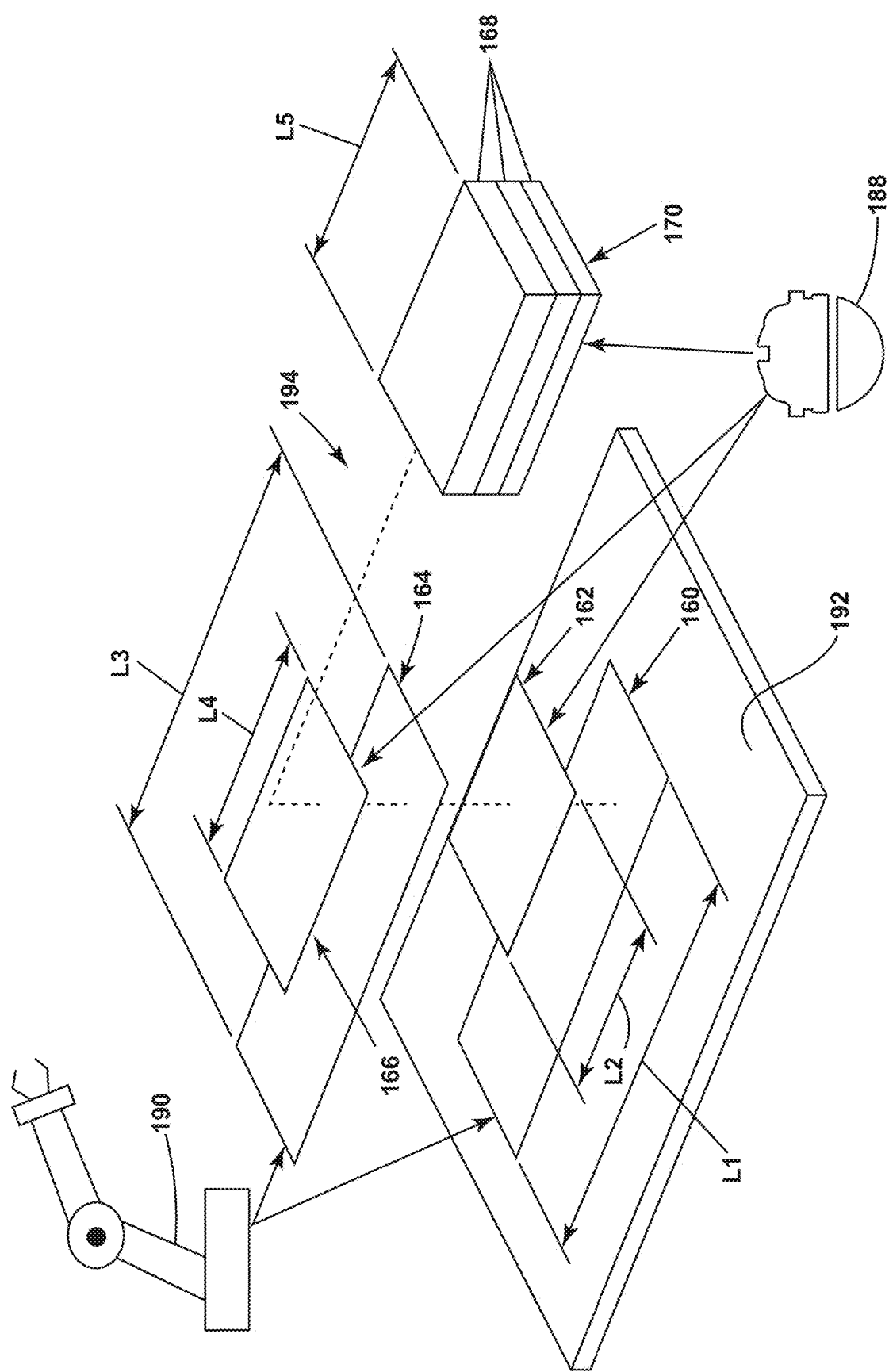
FIG. 4 is a schematic exploded, perspective view of a section of the composite airfoil of FIG. 3, further illustrating a stack of plies.

FIG. 4 is a schematic exploded, perspective view of a manufacture of a section of the composite airfoil 104 of FIG. 3. The composite airfoil 104 can include a plurality of plies that are stacked on top of one another. The plurality of plies can be stacked in the chordwise direction (Cd) of FIG. 3, spanwise direction (Sd) of FIG. 3, radially with respect to the centerline axis 136 of FIG. 3, or a combination thereof. As illustrated, the plurality of plies are stacked on top of each other radially with respect to the centerline axis 136. The plurality of plies can include a first ply 160, a second ply 162, a third ply 164, a fourth ply 166, and a set of fifth plies 168. While only five plies are illustrated, it will be appreciated that the composite airfoil 104 can include any number of two or more plies. At least one ply of the plurality of plies is provided within the first set of plies 140 (FIG. 3) and at least one ply of the plurality of plies is provided within the second set of plies 142 (FIG. 3). The illustrated arrangement and respective maximum fiber lengths of the first ply 160, the second ply 162, the third ply 164, the fourth ply 166, and the set of fifth plies 168 is for illustrative purposes only.

Each ply of the plurality of plies extends a maximum fiber length. As used herein, the maximum fiber length is the total distance that a longest fiber of a respective ply extends. It will be appreciated that the maximum fiber length is not necessarily the maximum length of the ply. As a non-limiting example, an exemplary ply can have a maximum length or width of 20 inches, however, the longest fiber within the exemplary ply may extend 2 inches. As such, the maximum fiber length for the exemplary ply is 2 inches.

The maximum fiber length of each ply of the plurality of plies can be the in the spanwise direction (Sd), the chordwise direction (Cd), or a combination thereof. The first ply 160 includes a first maximum fiber length (L1). The second ply 162 includes a second maximum fiber length (L2). The third ply 164 includes a third maximum fiber length (L3). The fourth ply 166 includes a fourth maximum fiber length (L4). The set of fifth plies 168 include a fifth maximum fiber length (L5). The first maximum fiber length (L1), the second maximum fiber length (L2), the third maximum fiber length (L3), the fourth maximum fiber length (L4), the fifth maximum fiber length (L5), or a combination thereof, can be equal to or non-equal to each other.

The differentiation between the first set of plies 140 and the second set of plies 142 is defined by a threshold fiber length. If a maximum fiber length of a respective ply is greater than or equal to the threshold fiber length, the respective ply is categorized in the first set of plies 140. If a maximum fiber length of a respective ply is less than the threshold fiber length, the respective ply is categorized in the second set of plies 142. The threshold fiber length can be greater than or equal to 9 inches and less than or equal to 20 inches in some non-limiting examples. As a non-limiting example, the threshold fiber length can be 12 inches.

As a non-limiting example, the first maximum fiber length (L1) and the third maximum fiber length (L3) can each be greater than or equal to the threshold fiber length. As such, the first ply 160 and the third ply 164 can be part of the first set of plies 140. As a non-limiting example, the second maximum fiber length (L2), the fourth maximum fiber length (L4) and the fifth maximum fiber length (L5) can be less than the threshold fiber length. As such, the second ply 162, the third ply 164 and the set of fifth plies 168 can be part of the second set of plies 142.

The first ply 160, the second ply 162, the third ply 164, the fourth ply 166, the set of fifth plies 168, or any other plies can collectively define a stack of plies 194 of the composite airfoil assembly 104. Then during manufacture, the stack of plies 194 can be formed along a tooling surface 192. The tooling surface 192 can be any suitable surface or device where the composite airfoil assembly 104 can be formed by stacking one or more plies to form the stack of plies 194. As a non-limiting example, the tooling surface 192 can be a mold tool.

During a manufacture of the composite airfoil 104, the plurality of plies are stacked and subsequently bonded together. At least a first portion of the plurality of plies can be stacked and bonded together to define a first body at a first time. At least a second portion, different from the first portion, of the plurality of plies can be stacked and bonded together to define a second body at a second time, the same as or different from the first time. The second body can then be coupled to the first body at a third time, after the first time and the second time, to define a unitary body of the first body and the second body. As a non-limiting example, the first body can be defined by the first ply 160, the second ply 162, the third ply 164, and the fourth ply 166, while the second body can be defined by the set of fifth plies 168 that are stacked together to form a packet 170. The packet 170 can be bonded to the first body after the plies in the first body are bonded together. The packet 170 can be any suitable portion of the composite airfoil 104. As a non-limiting example, the packet 170 can be an insert of the set of insert plies 150 (FIG. 3).

The threshold fiber length can be set based on the manufacturing method of the composite airfoil 104. Specifically, all plies of the first set of plies 140 (greater than or equal to the threshold fiber length) are stacked along respective portions of the stack of plies 194 automatically through, for example, automated fiber placement (AFP) manufacture methods. As used herein, AFP manufacture methods refer to any suitable method of physically placing fibers automatically without direct human intervention. As a non-limiting example, an AFP manufacturing method can include the placement of plies along the composite airfoil 104 through robotics 190. All plies of the second set of plies 142 (less than the threshold fiber length) are stacked along respective portions of the stack of plies 194 manually through, for example, human manufacturing methods. As used herein, human manufacturing methods refer to any suitable method of manually placing a ply along the composite airfoil 104 with direct human intervention. As a non-limiting example, a human 188 can pick up and place a ply along the composite airfoil 104 during the human manufacturing process. As a non-limiting example, the first ply 160 and the third ply 162 can be automatically placed, while the second ply 162, the fourth ply 166, and the set of fifth plies 168 can be manually placed. Put another way, the plies that are equal to or exceed the threshold fiber length are placed or otherwise stacked via the robotics 190, while the plies that are less than the threshold fiber length are placed or otherwise stacked via the human 188.

The placement of the first set of plies 140 can occur at a same or different time as the placement of the second set of plies 142. As a non-limiting example, all plies of the first set of plies 140 can be placed at a first time, and at least a portion of the second set of plies 142 can be placed at a second time, prior to or before the first time. As a non-limiting example, a portion of the first set of plies 140 can be placed at a first time, at least a portion of the second set of plies 142 can be placed at a second time, prior to or before the first time. At least a portion of the first set of plies 140 can be placed at a third time, different than the first time and the second time. As a non-limiting example, at least a portion of the first set of plies 140 and at least a portion of the second set of plies 142 can each be placed at a first time (e.g., at the same time). As a non-limiting example, the first ply 160 can be automatically placed at a first time, the second ply 162 can be manually placed at a second time, after the first time, the third ply 164 can be automatically placed at a third time, after the second time, the fourth ply 166 can be manually placed at a fourth time, after the third time, and the packet 170 can be manually placed at a fifth time, after the fourth time. The packet 170 can be formed before, during, or after the first time, the second time, the third time, or the fourth time. It will be appreciated that the placement of fibers automatically or manually can be done in any suitable pattern.

The automated placement of plies is faster than the manual placement of fibers and is better for the placement of bulk fibers. Automated placement of fibers can be utilized for larger sections of the composite airfoil 104, such as the airfoil portion 110. As a non-limiting example, large structural plies (e.g., the first set of structural plies 144 of FIG. 3 exceeding or equal to the threshold fiber length) are placed through automated placement. The manual placement of fibers, however, allows for a more precise placement of plies in, for example, harder to reach areas of the composite airfoil 104 or in otherwise smaller areas of the composite airfoil 104. As a non-limiting example, the set of insert plies 150 (FIG. 3) are relatively small compared to the rest of the composite airfoil 104 and, as such, the set of insert plies 150 are placed through manual placement. As a non-limiting example, the set of pad plies 146 and the set of machining plies 148 are provided on a portion of the composite airfoil 104 with a relatively small footprint or complex shape with respect to the rest of the composite airfoil 104 and, as such, the set of pad plies 146 and the set of machining plies 148 are placed through manual placement. As a non-limiting example, small structural plies (e.g., the second set of structural plies 145 of FIG. 3 less than the threshold fiber length) are placed through manual placement.

Figure 5:
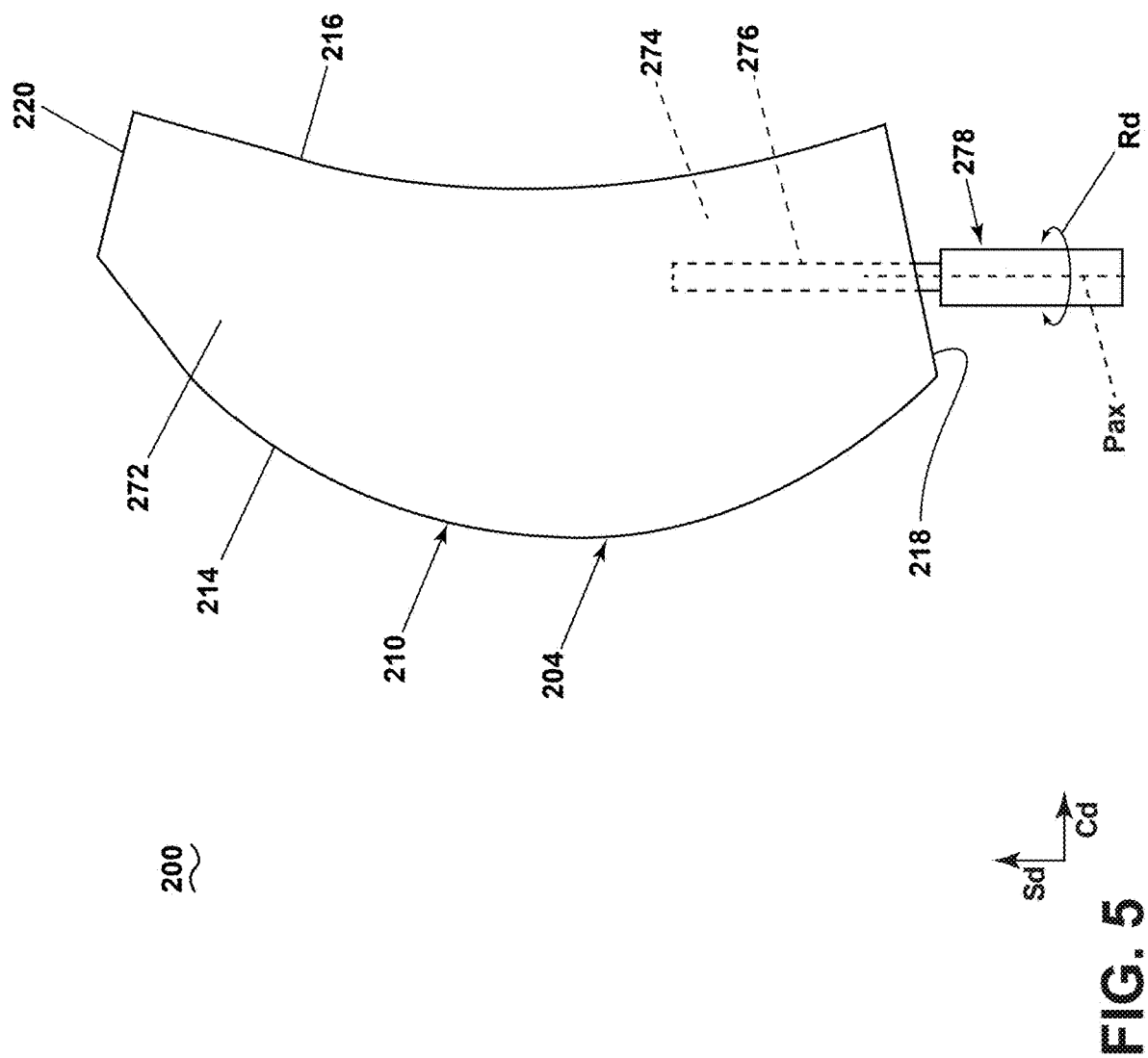
FIG. 5 is a schematic side-view of an exemplary assembly for use within the turbine engine of FIG. 1, the assembly including a spar and a trunnion.

FIG. 5 is a schematic side-view of an exemplary assembly 200 suitable for use within the turbine engine 10 of FIG. 1. The assembly 200 is similar to the assembly 100; therefore, like parts will be identified with like numerals increased to the 200 series with it being understood that the description of the assembly 100 applies to the assembly 200 unless noted otherwise.

The assembly 200 includes a composite airfoil 204. The composite airfoil 204 includes an airfoil portion 210. The airfoil portion 210 includes an outer wall 272 extending between a leading edge 214 and a trailing edge 216 in a chordwise direction (Cd), and between a root 218 and a tip 220 in a spanwise direction (Sd). The airfoil portion 210 includes an interior 274. It is contemplated that the composite airfoil 204 can be a blade, vane, airfoil, or other component of any turbine engine, such as, but not limited to, a gas turbine engine, a turboprop engine, a turboshaft engine, a ducted turbofan engine, an unducted turbofan engine, or an open rotor turbine engine. The outer wall 272 can be a composite wall made of one or more layers of composite material. The one or more layers of material can be applied during the same stage or different stages of the manufacturing of the composite airfoil 204.

The composite airfoil 204 is similar to the composite airfoil 104, 204 in that the composite airfoil 204 is at least partially formed by a first set of plies (e.g., the first set of plies 140 (FIG. 3)) and a second set of plies (e.g., the second set of plies 142 (FIG. 3)). The composite airfoil 204, however, does not include a dovetail portion (e.g., the dovetail portion 112 of FIG. 2). The assembly 200 instead includes a spar 276 extending outwardly from the root 218 of the airfoil portion 210. The assembly 200 further includes a trunnion 278.

The spar 276 extends into the interior 274. The spar 276 is operably coupled to the trunnion 278. The trunnion 278 can include any suitable material such as, but no limited to, a metallic material or a composite material. It will be appreciated that the term composite material can further include metals with a composite architecture (e.g., a metal matrix composite). In the case of a composite material, the trunnion 278 can be any suitable composite material such as a 2D or 3D composite, a laminate skin, a woven or braided composite, or any other suitable composite.

At least the spar 276 and a portion of the airfoil portion 210 include a composite material including the first set of plies (e.g., the first set of plies 140 of FIG. 3) and the second set of plies (e.g., the second set of plies 142 of FIG. 3). As a non-limiting example, the spar 276 can be made entirely of the second set of plies, while the airfoil portion 210 can be made at least partially through the first set of plies. In other words, the spar 276 can be manually formed (e.g., by hand) while at least a portion of the airfoil portion 210 can be automatically formed. Alternatively, at least a portion of the spar 276 can be formed by the first set of plies and thus be automatically formed. The spar 276 can be formed separately from the airfoil portion 210 and subsequently coupled to the airfoil portion 210. In other words, the spar 276 can be formed as a packet (e.g., the packet 170 of FIG. 3) and subsequently coupled to the airfoil portion 210.

During operation of the composite airfoil 204, the trunnion 278 can rotate about a pitch axis (Pax) in a rotational direction (Rd). As the spar 276 couples the trunnion 278 to the airfoil portion 210, rotation of the trunnion 278 in the rotational direction (Rd) causes the airfoil portion 210 to rotate about the pitch axis (Pax). This rotation can be used to control the pitch of the composite airfoil 204 such that the composite airfoil 204 is defined as a variable pitch airfoil assembly. As such, the composite airfoil 204 can be defined as a variable pitch airfoil assembly. The pitch of the composite airfoil 204 can be varied based on the operation or intended operation of the turbine engine (e.g., the turbine engine 10 of FIG. 1) in which the composite airfoil 204 is provided.

The variable pitch airfoil assembly can be provided within any suitable portion of a turbine engine (e.g., the turbine engine 10 of FIG. 1). As a non-limiting example, the turbine engine can be an unducted turbine engine and the variable pitch airfoil assembly can be provided within the fan section of the unducted turbine engine. As such, the variable pitch airfoil assembly can be an external fan blade that extends outwardly from a nacelle of the unducted turbine engine. It will be appreciated that the assembly 100 (FIG. 2), 200, or any other assembly, can be provide within any suitable portion of a turbine engine or within any suitable turbine engine. As a non-limiting example, the assembly 100, 200, or any other assembly can be an external fan blade or fan vane of an unducted turbine engine, an airfoil within a fan section, an airfoil within a compressor section, an airfoil within the turbine section, or any combination thereof.

Figure 6:
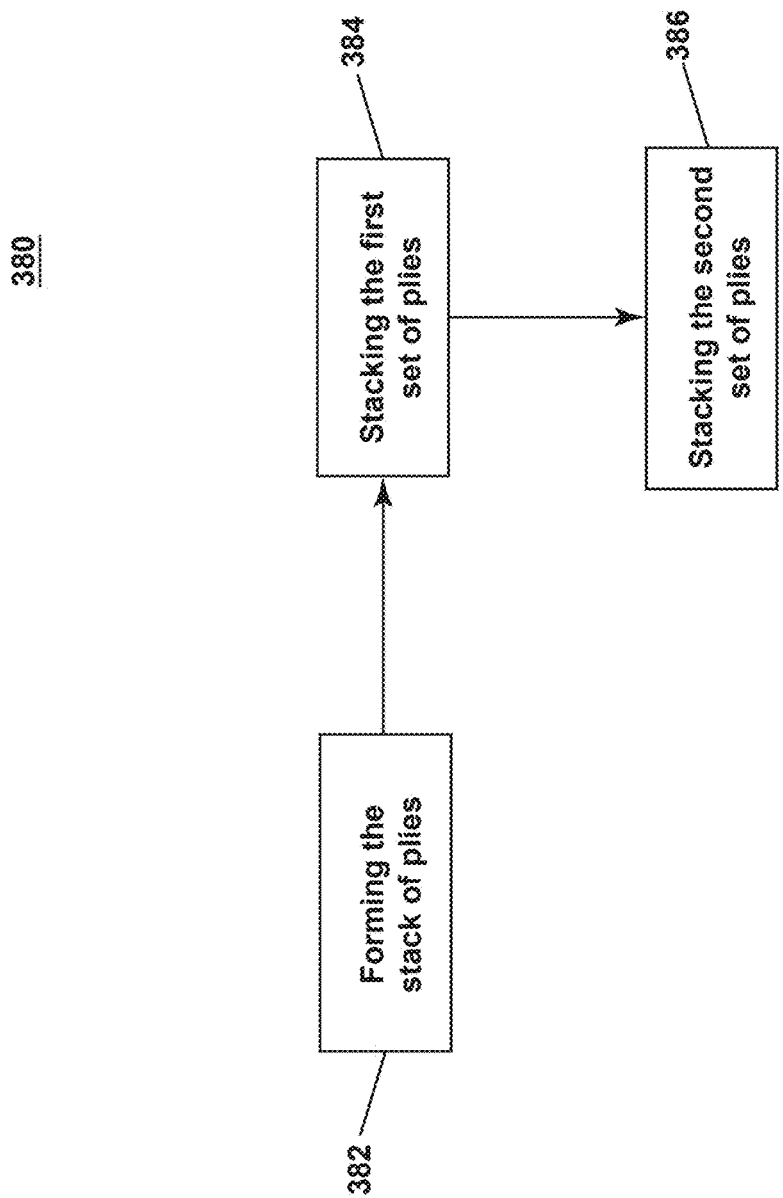
FIG. 6 is a flowchart illustrating a method of forming the assembly of FIG. 3.

FIG. 6 is flowchart illustrating a method 380 of forming the assembly 100 of FIG. 2. As a non-limiting example, the method 380 is of forming the composite airfoil 104 of FIG. 3. While described in terms of the method 380 of forming the assembly 100, it will be appreciated that the method 380 can be applied to the assembly 200 of FIG. 5 or any other suitable assembly.

The method 380 includes forming the stack of plies 194, at 382. The forming of the stack of plies 194 is done by stacking the first set of plies 140 along the stack of plies 194, at 384. Each ply of the first set of plies 140 extends a respective fiber length that is greater than or equal to the threshold fiber length. The first set of plies 140 can be stacked along at least a portion of the composite airfoil 104 of FIG. 3 that defines the airfoil portion 110. The forming of the stack of plies 194 is further done by stacking the second set of plies 142, at 386. Each ply of the second set of plies 142 extends a respective fiber length that is greater than or equal to the threshold fiber length.

The sequence depicted is for illustrative purposes only and is not meant to limit the method 380 in any way as it is understood that the portions of the method can proceed in a different logical order, additional or intervening portions can be included, or described portions of the method can be divided into multiple portions, or described portions of the method can be omitted without detracting from the described method.

As a non-limiting example, the method 380 can include automatically stacking, at 384, the first set of plies 140, and manually stacking, at 386, the second set of plies 142. As a non-limiting example, the method 380 can include automatically stacking, at 384 and through automated fiber placement, the first set of plies 140. As a non-limiting example, the method 380 can include manually stacking, at 386 and through human intervention, the second set of plies 142.

As a non-limiting example, the method 380 can include forming, at 382, the stack of plies 194 by stacking less than a first portion of the first set of plies 140, the second set of plies 142, or a combination thereof, at a first time, and stacking second portion of the first set of plies 140, the second set of plies 142, or a combination thereof, at a second time. With the first time being prior to the second time. Put another way, a portion of (e.g., less than an entirety of) or the entirety of first set of plies 140, the second set of plies 142, or a combination thereof can be stacked in tandem with each other (e.g., at the same time) or separate from each other (e.g., at differing times). As a non-limiting example, the method 380 can include stacking, at a first time, an entirety of the first set of plies 140, and stacking, at a second time different from the first time, the second set of plies 142. As a non-limiting example, the method 380 can include stacking, at a first time, a first portion of the first set of plies 140, stacking, at a second time different from the first time, at least a portion of the second set of plies 142, and stacking, at a third time different from the first time and the second time, a second portion, different from the first portion, of the first set of plies 140. As a non-limiting example, the method 380 can include stacking two or more plies of the second set of plies 142 on top of one another exterior the stack of plies 194, and stacking the two or more plies of the second set of plies 142 on the stack of plies. In other words, the method 380 can include the formation of the packet 170 of FIG. 4 and subsequently stacking the packet 170 to the stack of plies 194.

As a non-limiting example, the method 300 can include intermittently stacking at least a portion of the first set of plies 140 and at least a portion of the second set of plies 142

As a non-limiting example, at least one ply of the first set of plies 140 can be automatically stacked and in between the next ply of the first set of plies 140 being stacked, at least one ply of the second set of plies 142 can be manually stacked. The method 300 can include reorientating or otherwise repositioning the AFP manufacturing method (e.g., the robotics 190 of FIG. 4). The method 300 can include manually stacking at least a portion of the second set of plies 142 during the reorienting or repositioning of the AFP manufacturing method.

As a non-limiting example, the method 380 can include forming specific portions of the assembly 200. As a non-limiting example, the method 380 can include stacking, at a first time, at least a portion of the first set of plies (e.g., the first set of plies 140), at a least a portion of the second set of plies (e.g., the second set of plies 142), or a combination thereof to form the spar 276 of FIG. 5. The method 380 can include positioning the spar 276 along a respective portion of the stack of plies (e.g. the stack of plies 194). As a non-limiting example, the method 380 can include stacking, at the first time, at least a portion of the second set of plies to form the spar 276. As a non-limiting example, the method 380 can include manually stacking, at the first time and through human intervention, at least a portion of the second set of plies to form the spar 276. As a non-limiting example, the method 380 can be used to form any suitable portion of the assembly 100, 200 such as, but not limited to, at least a portion of a skin of the outer wall 173, 273, an entirety of the composite airfoil 104, 204, at least a portion of an internal component of the composite airfoil 104, 204, at least a portion of the spar 276, at least a portion of the trunnion 278, or a combination thereof.

As a non-limiting example, the method 380 can include providing the first set of plies 140 as large structural plies (e.g., the first set of structural plies 144 of FIG. 3). As a non-limiting example, the method 380 can include providing the second set of plies 142 as at least one of small structural plies (e.g., the second set of structural plies 145 of FIG. 3), a set of pad plies (e.g., the set of pad plies 146 of FIG. 3), a set of machining plies (e.g., the set of machining plies 148 of FIG. 3), the set of insert plies (e.g., the set of insert plies 150 of FIG. 3), or a combination thereof. As a non-limiting example, the method 380 can include stacking the set of machining plies radially over, with respect to the centerline axis 136, the set of pad plies.

As a non-limiting example, the method 380 can include providing the first set of plies 140 and the second set of plies 142 such that the threshold fiber length is within a range of greater than or equal to 8 inches and less than or equal to 20 inches. As a non-limiting example, the method 380 can include providing the first set of plies 140 and the second set of plies 142 such that the threshold fiber length is 12 inches.

As a non-limiting example, the method 380 can include providing the first set of plies 140, at 182, with each ply of the first set of plies 140 extending the respective maximum fiber length in the spanwise direction. As a non-limiting example, the method 380 can include providing the second set of plies 142, at 184, with each ply of the second set of plies 142 extending the respective maximum fiber length in the spanwise direction.

As a non-limiting example, the method 380 can include providing the assembly 100, 200 within a turbine engine (e.g., the turbine engine 10 of FIG. 1). As a non-limiting example, the method 380 can include providing the assembly within an unducted turbine engine having a fan section with a set of external fan blades, and forming the assembly 100, 200 as a variable pitch airfoil assembly provided within the set of fan blades.

As a non-limiting example, the method 380 can include bonding the stack of plies 194. As a non-limiting example, the method 380 can include finishing the formation of the stack of plies 194. After finishing the formation of the stack of plies 194, all plies within the stack of plies 194 can be bonded or otherwise cured such that they form a unitary body.

Benefits associated with the present disclosure includes a composite airfoil with a decreased burden of manufacture without sacrificing the overall construction of the composite airfoil when compared to a conventional airfoil. For example, conventional airfoils are either formed with a metallic material or a composite material. In terms of the conventional airfoil including the metallic material, the conventional airfoil is formed through, for example, casting. When formed with a composite material, however, the composite plies are either all automatically placed or all manually placed. When being formed through automated placement, larger sections of the conventional airfoil can be formed relatively quick, however, the machines required to perform the automated placement need to reorient themselves in order to lay plies of smaller size in more intricate areas (e.g., the dovetail portion). Further, with automated fiber placement, if it is desired to change up the direction that the plies are being stacked, the automated fiber placement system (e.g., the robotics) must be stopped and reoriented to ensure that the plies are being placed in the desired fashion. This process or reorienting the automated fiber placement system takes time and is burdensome. The more intricate detail that is required, the more the burden of manufacture is increased. If the conventional airfoil is formed through manual placement, it is relatively simple to shift from laying larger plies to smaller plies in the more intricate areas, however, the overall time required to manually lay all of the larger plies is much longer than the time require to automatically lay all of the larger plies. As such, manual placement also sees an increase in the burden of manufacture.

The composite airfoil as described herein, however, has found a hybrid approach to the manufacture that decreases the burden of manufacture. Specifically, the intricate portions of the composite airfoil, which were found to a have a maximum fiber length of less than the threshold fiber length, are manually laid, thus eliminating the need for the machine required for the automated placement to reorient itself. Further, anything having a fiber length greater than or equal to the threshold fiber length is able to be placed through automated placement, thus ensuring that the larger sections are placed as efficiently. Further the composite airfoil, as described herein, can be formed where automated placement occurs in tandem with or alternately with the manual placement. In other words, the manual placement can occur while plies are being automatically placed or in-between times where plies are being automatically placed. For example, while some plies are being automatically placed, a packet can be manually formed and then manually placed in the correct position along the fibers that have already been placed. For example, automated placement can occur and the machine required for the automated placement may need to be adjusted, which requires time. During this time, some plies can be manually placed until the automated placement can resume.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A method of forming an assembly including a stack of plies, and an airfoil portion, the airfoil portion having an outer wall extending between a root and a tip in a spanwise direction, and between a leading edge and a trailing edge in the chordwise direction, the method comprising forming the stack of plies by stacking a first set of plies along a first portion of the assembly, the first portion including at least the airfoil portion, each ply of the first set of plies extending a respective maximum fiber length, with the respective maximum fiber length of each ply of the first set of plies being greater than or equal to a threshold fiber length, and stacking a second set of plies along a second portion of the assembly, each ply of the second set of plies extending a respective maximum fiber length, with the respective maximum fiber length of each ply of the second set of plies being less than the threshold fiber length.

The method of any preceding clause, wherein forming the stack of plies is done by automatically stacking the first set of plies along a first portion of the assembly; and
manually stacking the second set of plies along a second portion of the assembly.

The method of any preceding clause, further comprising automatically stacking, via automated fiber placement, the first set of plies along a first portion of the assembly; and The method of any preceding clause, further comprising rising manually stacking, via human intervention, the second set of plies.

The method of any preceding clause, wherein forming the stack of plies is done by intermittently stacking the first set of plies and the second set of plies.

The method of any preceding clause, wherein forming the stack of plies is done by stacking, at a first time, a first portion of the first set of plies, stacking, at a second time different from the first time, at least a portion of the second set of plies, and stacking, at a third time different from the first time and the second time, a second portion, different from the first portion, of the first set of plies.

The method of any preceding clause, wherein forming the stack of plies is done by stacking two or more plies of the second set of plies on top of one another, bonding the two or more plies of the second set of plies, and stacking the two or more bonded plies of the second set of plies on the stack of plies.

The method of any preceding clause, wherein the assembly includes a spar extending into an interior of the airfoil portion, the method comprising stacking, at a first time, at least one of at least a portion of the first set of plies, at least a portion of the second set of plies, or a combination thereof to form the spar, and positioning, at a second time after the first time, the spar along a respective portion of the stack of plies.

The method of any preceding clause, further comprising stacking, at the first time, at least a portion of the second set of plies to form the spar.

The method of any preceding clause, further comprising manually stacking, via human intervention and at the first time, at least a of the second set of plies to form the spar.

The method of any preceding clause, further comprising stacking the first set of plies, the first set of plies being a set of large structural plies.

The method of any preceding clause, further comprising stacking the second set of plies, the second set of plies including at least one of a set of pad plies, a set of insert plies, a set of machining plies, a set of small structural plies, or a combination thereof.

The method of any preceding clause, wherein the airfoil portion includes a centerline axis, and forming the stack of plies is done by stacking the set of machining plies radially over, with respect to the centerline axis, the set of pad plies.

The method of any preceding clause, further comprising stacking the first set of plies and the second set of plies such that the threshold fiber length being within a range of greater than or equal to 8 inches and less than or equal to 20 inches.

The method of any preceding clause, further comprising stacking the first set of plies and the second set of plies such that the threshold fiber length is 12 inches.

The method of any preceding clause, further comprising stacking the first set of plies, each ply of the first set of plies extending the respective maximum fiber length in the spanwise direction, and stacking a second set of plies, each ply of the second set of plies extending the respective maximum fiber length in the spanwise direction.

The method of any preceding clause, further comprising stacking the assembly within a turbine engine.

The method of any preceding clause, wherein the assembly includes a spar extending into an interior of the airfoil portion, the method further comprising stacking the assembly within an unducted turbine engine having a fan section with a set of external fan blades, and forming the assembly as a variable pitch airfoil assembly provided within the set of external fan blades.

A composite airfoil comprising an airfoil portion having an outer wall extending between a root and a tip in a spanwise direction, and between a leading edge and a trailing edge in a chordwise direction, a first set of plies forming at least a portion of the airfoil portion, each ply of the first set of plies extending a respective maximum fiber length, with the respective maximum fiber length of each ply of the first set of plies being greater than or equal to a threshold fiber length, and a second set of plies, with each ply of the second set of plies extending a respective maximum fiber length, with the respective maximum fiber length of each ply of the second set of plies being less than the threshold fiber length.

A composite airfoil comprising an airfoil portion having an outer wall extending between a root and a tip in a spanwise direction, and between a leading edge and a trailing edge in a chordwise direction, a first set of plies forming at least a portion of the airfoil portion, each ply of the first set of plies extending a respective maximum fiber length, with the respective maximum fiber length of each ply of the first set of plies being greater than or equal to a threshold fiber length, and a second set of plies, with each ply of the second set of plies extending a respective maximum fiber length, with the respective maximum fiber length of each ply of the second set of plies being less than the threshold fiber length.

A method of forming the composite airfoil of any preceding clause, the method comprising automatically placing the first set of plies, and manually placing the second set of plies.

The method of any preceding clause, further comprising automatically placing, via automated fiber placement, the first set of plies.

The method of any preceding clause, further comprising manually placing, through human intervention, the second set of plies.

The method of any preceding clause, further comprising placing, at a first time, an entirety of the first set of plies, and placing, at a second time different from the first time, the second set of plies.

The method of any preceding clause, further comprising placing, at a first time, a portion of the first set of plies, placing, at a second time different from the first time, at least a portion of the second set of plies, and placing, at a third time different from the first time and the second time, at least a portion of the first set of plies.

The method of any preceding clause, further comprising bonding at least two plies of the first set of plies, the second set of plies or a combination thereof at a first time to define a first body, bonding at least two plies of the first set of plies, the second set of piles, or a combination thereof at a second time to define a second body, and bonding the first body and the second body to form a unitary body at a third time, after the first time and the second time.

The method of any preceding clause, further comprising placing, at a first time, at least a portion of the first set of plies, and placing, at the first time, at least a portion of the second set of plies.

The method of any preceding clause, further comprising forming a spar by placing, at a first time, at least a portion of first set of plies, at least a portion of the second set of plies, or a combination thereof, and bonding, at a second time after the first time, the at least a portion of first set of plies, at least a portion of the second set of plies, or a combination thereof to form a unitary body defining the spar, and placing, at a third time after the second time, the unitary body defining the spar within a respective portion of the airfoil assembly.

The composite airfoil or method of any preceding clause, further comprising a dovetail portion extending from the root of the airfoil portion and terminating at a proximal end, with at least a portion of the second set of plies being provided along a respective portion of the proximal end.

The composite airfoil or method of any preceding clause, wherein the dovetail portion includes an exterior surface defined by the second set of plies.

The composite airfoil or method of any preceding clause, wherein the threshold fiber length is within a range of greater than or equal to 8 inches and less than or equal to 20 inches.

The composite airfoil or method of any preceding clause, wherein the second set of plies include at least one of a machining ply, a pad ply, an insert ply, or a small structural ply.

The composite airfoil or method of any preceding clause, wherein the first set of plies include a large structural ply having a fiber length greater than a fiber length of the small structural ply.

The composite airfoil or method of any preceding clause, wherein at least two of the machining ply, the pad ply, the small structural ply, or the insert ply have a varying fiber orientation or material with respect to each other.

The composite airfoil or method of any preceding clause, wherein the threshold fiber length is 12 inches.

The composite airfoil or method of any preceding clause, wherein the respective maximum fiber length of the first set of plies and the second set of plies is in the spanwise direction.

A turbine engine comprising the composite airfoil or method of any preceding clause, further comprising a fan section, a compressor section and a turbine section in serial flow arrangement.

The turbine engine of any preceding clause, wherein the composite airfoil is provided within the compressor section or the turbine section.

The turbine engine of any preceding clause, wherein the turbine engine is an unducted turbine engine and the composite airfoil is an external fan blade provided within the fan section.

A method of forming the turbine engine of any preceding clause, the method comprising automatically placing the first set of plies, and manually placing the second set of plies.

The method of any preceding clause, further comprising automatically placing, via automated fiber placement, the first set of plies.

The method of any preceding clause, further comprising manually placing, through human intervention, the second set of plies.

The method of any preceding clause, further comprising placing, at a first time, an entirety of the first set of plies, and placing, at a second time different from the first time, the second set of plies.

The method of any preceding clause, further comprising placing, at a first time, a portion of the first set of plies, placing, at a second time different from the first time, at least a portion of the second set of plies, and placing, at a third time different from the first time and the second time, at least a portion of the first set of plies.

The method of any preceding clause, further comprising bonding at least two plies of the first set of plies, the second set of plies or a combination thereof at a first time to define a first body, bonding at least two plies of the first set of plies, the second set of piles, or a combination thereof at a second time to define a second body, and bonding the first body and the second body to form a unitary body at a third time, after the first time and the second time.

The method of any preceding clause, further comprising placing, at a first time, at least a portion of the first set of plies, and placing, at the first time, at least a portion of the second set of plies.

The method of any preceding clause, further comprising forming a spar by placing, at a first time, at least a portion of first set of plies, at least a portion of the second set of plies, or a combination thereof, and bonding, at a second time after the first time, the at least a portion of first set of plies, at least a portion of the second set of plies, or a combination thereof to form a unitary body defining the spar, and placing, at a third time after the second time, the unitary body defining the spar within a respective portion of the airfoil assembly.

The turbine engine or method of any preceding clause, further comprising a dovetail portion extending from the root of the airfoil portion and terminating at a proximal end, with at least a portion of the second set of plies being provided along a respective portion of the proximal end.

The turbine engine or method of any preceding clause, wherein the dovetail portion includes an exterior surface defined by the second set of plies.

The turbine engine or method of any preceding clause, wherein the threshold fiber length is within a range of greater than or equal to 8 inches and less than or equal to 20 inches.

The turbine engine or method of any preceding clause, wherein the second set of plies include at least one of a machining ply, a pad ply, an insert ply, or a small structural ply.

The turbine engine or method of any preceding clause, wherein the first set of plies include a large structural ply having a fiber length greater than a fiber length of the small structural ply.

The turbine engine or method of any preceding clause, wherein at least two of the machining ply, the pad ply, the small structural ply, or the insert ply have a varying fiber orientation or material with respect to each other.

The turbine engine or method of any preceding clause, wherein the threshold fiber length is 12 inches.

The turbine engine or method of any preceding clause, wherein the respective maximum fiber length of the first set of plies and the second set of plies is in the spanwise direction.

What is claimed is:

1. A method of forming an assembly including a stack of plies, and an airfoil portion, the airfoil portion having an outer wall extending between a root and a tip in a spanwise direction, and between a leading edge and a trailing edge, the method comprising:
    forming the stack of plies by:
        automatically stacking a first set of plies along a first portion of the assembly, the first portion including at least the airfoil portion, each ply of the first set of plies extending a respective maximum fiber length, with the respective maximum fiber length of each ply of the first set of plies being greater than or equal to a threshold fiber length; and
        manually stacking a second set of plies along a second portion of the assembly, each ply of the second set of plies extending a respective maximum fiber length, with the respective maximum fiber length of each ply of the second set of plies being less than the threshold fiber length.

2. The method of claim 1, further comprising automatically stacking, via automated fiber placement, the first set of plies along the first portion of the assembly.

3. The method of claim 1, further comprising manually stacking, via human intervention, the second set of plies.

4. The method of claim 1, wherein forming the stack of plies is done by intermittently stacking the first set of plies and the second set of plies.

5. The method of claim 1, wherein forming the stack of plies is done by:
    stacking, at a first time, a first portion of the first set of plies;
    stacking, at a second time different from the first time, at least a portion of the second set of plies; and
    stacking, at a third time different from the first time and the second time, a second portion, different from the first portion, of the first set of plies.

6. The method of claim 1, wherein forming the stack of plies is done by:
    stacking two or more plies of the second set of plies on top of one another exterior the stack of plies to form a packet;
    stacking the packet along the stack of plies.

7. The method of claim 1, wherein the assembly includes a spar extending into an interior of the airfoil portion, the method comprising:
    stacking, at a first time, at least one of at least a portion of the first set of plies, at least a portion of the second set of plies, or a combination thereof to form the spar; and
    positioning, at a second time after the first time, the spar along a respective portion of the stack of plies.

8. The method of claim 7, further comprising stacking, at the first time, at least a portion of the second set of plies to form the spar.

9. The method of claim 7, further comprising manually stacking, via human intervention and at the first time, at least a of the second set of plies to form the spar.

10. The method of claim 1, further comprising stacking the first set of plies, the first set of plies being a set of large structural plies.

11. The method of claim 1, further comprising stacking the second set of plies, the second set of plies including at least one of a set of pad plies, a set of insert plies, a set of machining plies, a set of small structural plies, or a combination thereof.

12. The method of claim 11, wherein the airfoil portion includes a centerline axis, and forming the stack of plies is done by:
    stacking the set of machining plies radially over, with respect to the centerline axis, the set of pad plies.

13. The method of claim 1, further comprising stacking the first set of plies and the second set of plies such that the threshold fiber length being within a range of greater than or equal to 8 inches and less than or equal to 20 inches.

14. The method of claim 1, further comprising stacking the first set of plies and the second set of plies such that the threshold fiber length is 12 inches.

15. The method of claim 1, further comprising:
    stacking the first set of plies, each ply of the first set of plies extending the respective maximum fiber length in the spanwise direction; and
    stacking a second set of plies, each ply of the second set of plies extending the respective maximum fiber length in the spanwise direction.

16. The method of claim 1, further comprising providing the assembly within a turbine engine.

17. The method of claim 1, wherein the assembly includes a spar extending into an interior of the airfoil portion, the method further comprising:
    stacking the assembly within an unducted turbine engine having a fan section with a set of external fan blades; and
    forming the assembly as a variable pitch airfoil assembly provided within the set of external fan blades.

18. The method of claim 1, wherein the respective maximum fiber length of the first set of plies and the second set of plies is in the spanwise direction.

19. A composite airfoil comprising:
    an airfoil portion having an outer wall extending between a root and a tip in a spanwise direction, and between a leading edge and a trailing edge;
    a first set of plies forming at least a portion of the airfoil portion, each ply of the first set of plies extending a respective maximum fiber length, with the respective maximum fiber length of each ply of the first set of plies being greater than or equal to a threshold fiber length; and a second set of plies, with each ply of the second set of plies extending a respective maximum fiber length, with the respective maximum fiber length of each ply of the second set of plies being less than the threshold fiber length, wherein the threshold fiber length is within a range of greater than or equal to 8 inches and less than or equal to 20 inches.

20. The composite airfoil of claim 19, wherein the threshold fiber length is 12 inches.

* * * * *